US012743129B2

(12) United States Patent
Luo et al.

(10) Patent No.: US 12,743,129 B2
(45) Date of Patent: Sep. 22, 2026

(54) DISPLAY MODULE AND DISPLAY DEVICE

(71) Applicant: BOE TECHNOLOGY GROUP CO., LTD., Beijing (CN)

(72) Inventors: Xiaofei Luo, Beijing (CN); Zhao Li, Beijing (CN); Yanyan Yang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 370 days.

(21) Appl. No.: 18/697,317

(22) PCT Filed: Aug. 9, 2023

(86) PCT No.: PCT/CN2023/111906
§ 371 (c)(1),
(2) Date: Mar. 29, 2024

(87) PCT Pub. No.: WO2024/041379
PCT Pub. Date: Feb. 29, 2024

(65) Prior Publication Data

US 2024/0402763 A1 Dec. 5, 2024

(30) Foreign Application Priority Data

Aug. 24, 2022 (CN) ......................... 202211023915.5

(51) Int. Cl.
*G06F 1/16* (2006.01)

(52) U.S. Cl.
CPC .......... *G06F 1/1652* (2013.01); *G06F 1/1656* (2013.01)

(58) Field of Classification Search
CPC ......... G06F 1/1652; G06F 1/1656; G06F 9/30
See application file for complete search history.

(56) References Cited

U.S. PATENT DOCUMENTS

2020/0136066 A1 4/2020 Jin
2024/0172404 A1* 5/2024 Sun ......................... G09F 9/301

FOREIGN PATENT DOCUMENTS

| | | | |
|---|---|---|---|
| CN | 109559639 | A | 4/2019 |
| CN | 112987403 | A | 6/2021 |
| CN | 113241341 | A | 8/2021 |
| CN | 113539093 | A | 10/2021 |

(Continued)

OTHER PUBLICATIONS

CN 113241341 Machine Translation (Year: 2021).*

(Continued)

*Primary Examiner* — Zachary M Davis
(74) *Attorney, Agent, or Firm* — WHDA, LLP

(57) ABSTRACT

Display module and device are disclosed. The display module includes a display area, a bonding area, a bending area, a support structure, and first and second back film layers; the bending area has a bending start position and a bending end position; the first back film layer has a first end adjacent to the bending area, the second back film layer has a fourth end adjacent to the bending area, there is a gap between the first end and the bending start position, and between the fourth end and the bending end position; a light-emitting side of the display area is provided with a polarizer, and the polarizer has a second end which is flush with the bending start position; and a third end of a limiting support layer is flush with the bending end position.

20 Claims, 2 Drawing Sheets

(56) References Cited

FOREIGN PATENT DOCUMENTS

| | | | |
|---|---|---|---|
| CN | 113658534 | A | 11/2021 |
| CN | 114023905 | A | 2/2022 |
| CN | 114067685 | A | 2/2022 |
| CN | 114256302 | A | 3/2022 |
| CN | 114550589 | A | 5/2022 |
| CN | 114613269 | A | 6/2022 |
| CN | 114822267 | A | 7/2022 |
| CN | 114822285 | A | 7/2022 |
| CN | 115691324 | A | 2/2023 |
| JP | 2019-035942 | A | 3/2019 |
| WO | 2022/056995 | A1 | 3/2022 |

OTHER PUBLICATIONS

CN 114023905 Machine Translation (Year: 2022).*
Office Action dated Jan. 24, 2025, issued in counterpart CN Application No. 202211023915.5, with English translation. (16 pages).

* cited by examiner

DISPLAY MODULE AND DISPLAY DEVICE

CROSS-REFERENCE TO RELATED APPLICATIONS

This application is the U.S. national phase of PCT Application No. PCT/CN2023/111906 filed on Aug. 9, 2023, which claims priority to Chinese Patent Application No. 202211023915.5 filed in China on Aug. 24, 2022, which is incorporated herein by reference in its entirety.

TECHNICAL FIELD

The present disclosure relates to the technical field of display products and manufacturing the same, and more particularly, to a display module and a display device.

BACKGROUND

As the full-screen mobile phone becomes widely used, the frame of the mobile phone becomes narrower, and a radius of a flexible screen for pad bending becomes smaller. In small radius pad bending (e.g., with the bend radius being 0.2 mm to 0.1 mm), the bending strain to which the SD (metal wire) is subjected may increase significantly, which may easily cause problems such as the metal wire crack, leading to displaying abnormal.

SUMMARY

The present disclosure provides a display module and a display device, which can prevent metal wire(s) from being cracked due to a large strain force.

In order to achieve this, according to embodiments of the present disclosure, the following technical solutions are adopted. A display module: including: a display panel, where the display panel includes a display area, a bonding area, and a bending area located between the display area and the bonding area, wherein the bending area enables the bonding area to be bent to a backlight side of the display area, and when the bending area is in a bent state, the backlight side of the display area is provided with a first back film layer, wherein

- a direction from the display area to the bending area is a first direction, and the first direction is arranged to be parallel to a display surface of the display area;
- the bending area includes a bending start position and a bending end position, wherein the bending start position is connected to the display area, and the bending end position is connected to the bonding area;
- in the first direction, the first back film layer has a first end adjacent to the bending area, a gap is provided between the first end and the bending start position;
- a polarizer is disposed at a light-emitting side of the display area, and in the first direction, the polarizer has a second end adjacent to the bending area, and the second end is flush with the bending start position; and
- when the bending area is in the bent state, a limiting support layer is provided at a side of the bonding area away from the display area, and a third end of the limiting support layer adjacent to the bending area is flush with the bending end position.

Optionally, a support structure is provided between the display area and the bonding area, the first back film layer is provided between the support structure and the display area, and a second back film layer is provided between the support structure and the bonding area; and

- in the first direction, the second back film layer has a fourth end adjacent to the bending area, a gap is provided between the fourth end and the bending end position.

Optionally, in the first direction, a distance between the first end and the bending start position ranges from 100 μm to 300 μm.

Optionally, in the first direction, a distance between the fourth end and the bending end position ranges from 100 μm to 500 μm.

Optionally, the display module further includes a cover plate located at a light-emitting side of the display panel, and an orthographic projection of the first back film layer onto the cover plate is within an orthographic projection of the polarizer onto the cover plate.

Optionally, an orthographic projection of the second back film layer onto the cover plate is within the orthographic projection of the polarizer onto the cover plate.

Optionally, when the bending area is in the bent state, the orthographic projection of the second back film layer onto the cover plate partially overlaps with an orthographic projection of the limiting support layer onto the cover plate.

Optionally, when the bending area is in the bent state, the orthographic projection of the second back film layer onto the cover plate is located at a side of an orthographic projection of the limiting support layer onto the cover plate away from the bending area.

Optionally, in a second direction, the support structure has a first surface away from the display area, a buffer layer is disposed at a side of the first surface away from the display area; the second back film layer at least partially covers the buffer layer; or, the second back film layer is located at a side of the buffer layer away from the bending area; the second direction is perpendicular to the first direction, and the second direction is parallel to a light-emitting direction of the display module.

Optionally, an orthographic projection of the limiting support layer onto the cover plate partially overlaps an orthographic projection of the buffer layer onto the cover plate.

Optionally, in the first direction, a gap is provided between the buffer layer and the bending end position.

Optionally, in the first direction, the support structure has a third end adjacent to the bending area, the third end of the support structure is flush with the first end.

Optionally, an orthographic projection of the support structure onto the cover plate coincides with the orthographic projection of the first back film layer onto the cover plate.

Optionally, in a second direction, a thickness of the limiting support layer ranges from 50 μm to 200 μm, the second direction is perpendicular to the first direction, and the second direction is parallel to a light-emitting direction of the display module.

Optionally, an optical adhesive layer is provided between the polarizer and the cover plate, and an orthographic projection of the optical adhesive layer onto the cover plate is within the orthographic projection of the polarizer onto the cover plate.

Optionally, in the first direction, the optical adhesive layer has a fourth end adjacent to the bending area, a distance between the fourth end of the optical adhesive layer and the second end ranges from 50 μm to 100 μm.

Optionally, when the bending area is in the bent state, an outer side face of the bending area away from the support structure is not covered with a protective layer, and an inner side face of the bending area facing towards the support structure is provided with a protective structure.

Optionally, in a second direction, a cross-section of the protective structure is circular or elliptical, the second direction is perpendicular to the first direction, and the second direction is parallel to a light-emitting direction of the display module.

Optionally, a preset adhesive layer in a semi-cured state is provided at the bending area before bending the bending area, and the preset adhesive layer is cured to form the protective structure by absorbing moisture in a natural environment after bending the bending area.

Optionally, the thickness of the preset adhesive layer is greater than or equal to the thickness of the first back film layer.

Optionally, the thickness of the preset adhesive layer is greater than the thickness of the first back film layer, and when the bending area is in the bent state, the cross section of the protective structure in a direction perpendicular to the first back film layer is elliptical.

Optionally, the thickness of the preset adhesive layer is equal to the thickness of the first back film layer, and when the bending area is in the bent state, the cross section of the protective structure in a direction perpendicular to the first back film layer is semi-circular.

Optionally, a diameter of the protective structure is less than a distance between the first end of the first back film layer and the bending end position.

Embodiments of the present disclosure further provide a display device, including the display module described above.

Advantageous technical effects of the present disclosure are as follows: by arranging the first back film layer and the second back film layer to be shrunk inwardly, so that there is a gap between the first back film layer and the bending start position of the bending area, and there is a gap between the second back film layer and the bending end position of the bending area. In this way, the strain force to which the metal wire is subjected in the bent state can be reduced, thereby avoiding the metal wire from being cracked. In addition, the bending start position and the bending end position of the bending area are defined by the polarizer which is extended outwardly, and by the limiting support layer which is provided at the side of the bonding area away from the support structure, thereby ensuring the bending morphology of the bending area.

DETAILED DESCRIPTION

To make the objects, technical solutions and advantages of the embodiments of the present disclosure more apparent, a detailed description of embodiments of the present disclosure will be given hereinafter by reference to the appended drawings. It is to be understood that the described embodiments are part, but not all, of the embodiments of the present disclosure. Based on the embodiments of the present disclosure described, all other embodiments available to one of ordinary skill in the art fall within the scope of the present disclosure.

In the description of the present disclosure, It is to be noted that the terms “central”, “upper”, “lower”, “left”, “right”, “vertical”, “horizontal”, “inner”, “outer”, and the like indicate orientations or positional relationships based on the orientations or positional relationships shown in the figures, which is used merely for facilitating the description of the present disclosure and simplifying the description, and do not indicate or imply that the referenced devices or elements must have a particular orientation, be constructed and operated in a particular orientation, and thus should not be construed as limiting the present disclosure. Furthermore, the terms “first”, “second”, and “third” are used for descriptive purposes only and are not to be construed as indicating or implying relative importance.

Figure 4:
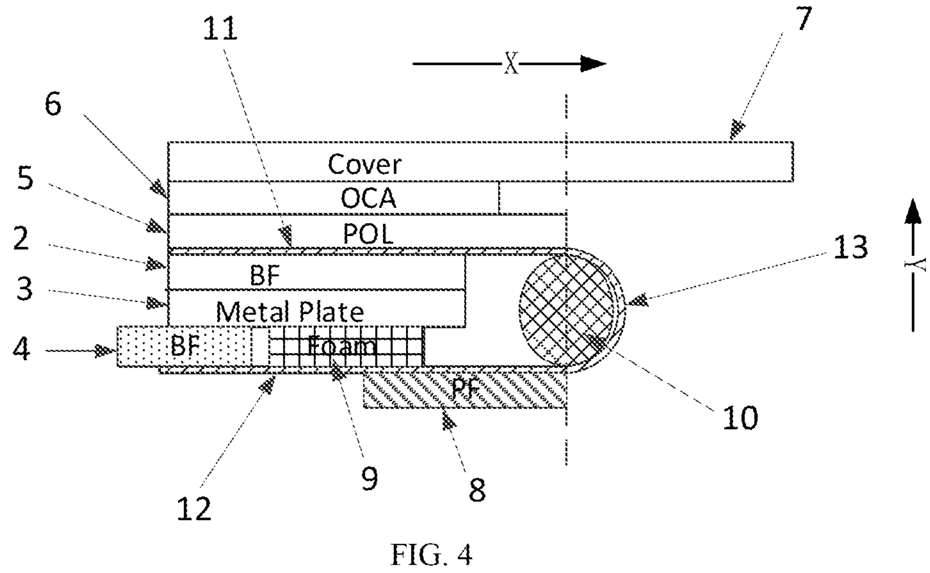
FIG. 4 shows a first schematic view of a display module according to an embodiment of the present disclosure.
Figure 5:
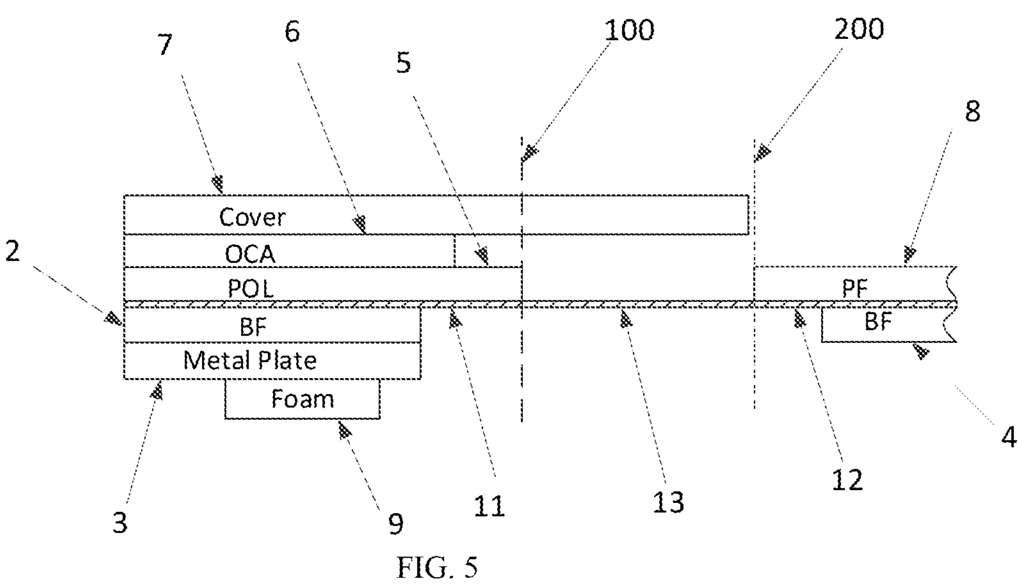
FIG. 5 shows a second schematic view of a display module according to an embodiment of the present disclosure.

Reference is made to FIGS. 4 and 5, in an embodiment, a display module is provided. The display module includes a display area 11 and a bonding area 12, and includes a bending area 13 located between the display area 11 and the bonding area 12. The bending area 13 enables the bonding area 12 to be bent to a backlight side of the display area 11, and when the bending area 13 is in a bent state, a support structure 3 is arranged between the display area 11 and the bonding area 12, a first back film layer 2 is arranged between the support structure 3 and the display area 11, and a second back film layer 4 is arranged between the support structure 3 and the bonding area 12.

A direction from the display area 11 to the bending area 13 is a first direction (referring to X direction in FIG. 4), and the first direction is parallel to a displaying surface of the display area 11.

The bending area 13 has a bending start position (referring to a position indicated by a dotted line 100 in FIG. 5) adjacent to the display area 11 and a bending end position (referring to a position indicated by a dotted line 200 in FIG. 5) away from the display area 11. The bending start position is connected to the display area, and the bending end position is connected to the bonding area.

In the first direction, the first back film layer 2 has a first end adjacent to the bending area 13, and there is a gap between the first end and the bending start position.

A polarizer 5 is provided at a light-emitting side of the display area 11. In the first direction, the polarizer 5 has a second end adjacent to the bending area 13, and the second end is flush with the bending start position (here, the “flush” means that a side face of the polarizer 5 adjacent to the bending area 13 is located in the same plane as the bending start position, and the plane is arranged to be perpendicular to the display area, and it should be noted that the “flush” herein can refer to a flush with some fabrication error, rather than an absolute flush).

Figure 1:
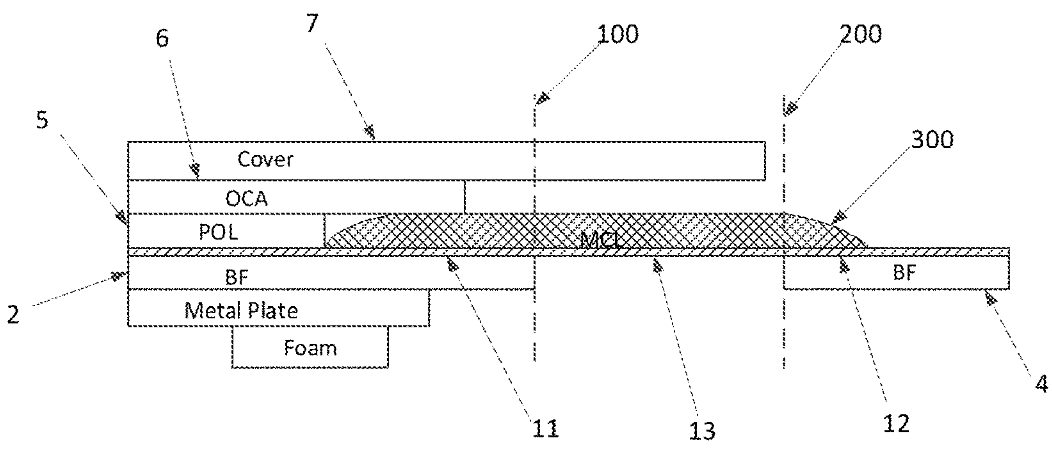
FIG. 1 shows a first schematic view of a display module.

When the bending area 13 is in the bent state, a limiting support layer is provided at a side of the bonding area 12 away from the display area, and a third end of the limiting support layer adjacent to the bending area 13 is flush with the bending end position (here, the “flush” means that a side face of the limiting support layer adjacent to the bending area is located in the same plane as the bending end position, and the plane is arranged to be perpendicular to the display area; and it should be noted that the “flush” herein can refer to a flush with some fabrication error, rather than an absolute flush). With reference to FIG. 1, in another embodiment, the bending start position (referring to a position indicated by a dotted line 100 in FIG. 1) of the bending area 13 is determined by the first back film layer 2, and the first back film layer 2 is located inside the bending area 13 (when the bending area 13 is in the bent state, the first back film layer 2 is located between the display area 11 and the bonding area 12). In order to prevent the first back film layer from being deformed when the bending area is bent, thereby affecting the bending morphology of the bending area, the modulus of the first back film layer 2 is relatively high. Therefore, when the bending area 13 is in the bent state, a bending stress applied to the bending area 13 at the bending start position is relatively large. Since an end of the first back film layer 2 is flush with the bending start position of the bending area, the first back film layer 2 applies a reaction force to the bending start position of the bending area when the bending area is in the bent state, so that metal wire(s) located at the bending start position may easily be broken. Comparing FIG. 1 with FIG. 5, in order to prevent such a broken in the metal wire(s), in this embodiment, the first back film layer 2 is shrunk inwardly, that is, in the first direction, the end of the first back film layer 2 adjacent to the bending area is moved to be away from the bending area, so that in the first direction, the first back film layer 2 has the first end adjacent to the bending area 13 with a gap between the first end and the bending start position. In this way, the bending stress at the bending start position can be reduced, thereby preventing metal wire(s) arranged on the bending area 13 from being cracked.

In order to ensure the bending morphology of the bending area 13, in the embodiment, the polarizer 5 located at the light-emitting side of the display area 11 is arranged to be extending outwardly. In the first direction, the polarizer 5 has a second end adjacent to the bending area 13, and the second end is flush with the bending start position, so as to determine the bending start position when the bending area 13 is bent. In addition, a limiting support layer 8 is provided at a side of the bonding area 12 away from the support structure 3, and a third end of the limiting support layer 8 adjacent to the bending area 13 is flush with the bending end position, so as to determine the bending end position when the bending area 13 is bent. Since the polarizer 5 is located at the light-emitting side of the display area 11, and when the bending area 13 is in the bent state, the limiting support layer 8 is located at a side of the bonding area 12 away from the support structure 3 (when the bending area 13 is in a unbent state, the polarizer 5 and the limiting support layer 8 are located at the same side of the display module), as such, the polarizer 5 and the limiting support layer 8 can cooperate to define the length of the bending area 13 while ensuring the bending morphology of the bending area 13, without increasing the bending stress at the bending start position and the bending end position.

In the first direction, the second back film layer 4 has a fourth end adjacent to the bending area 13, and there is a gap between the fourth end and the bending end position.

In another embodiment, the bending end position of the bending area 13 is determined by the second back film layer 4 (referring to a position indicated by a dotted line 200 in FIG. 1), when the bending area is in the bent state, the second back film layer 4 is located between the display area 11 and the bonding area 12. In order to prevent the second back film layer 4 from deforming when the bending area is bent, thereby affecting the bending morphology of the bending area, the modulus of the second back film layer 4 is relatively high. Therefore, when the bending area 13 is in the bent state, the bending stress applied to the bending area 13 at the bending end position is relatively large, and an end of the second back film layer 4 is flush with the bending end position of the bending area, then when the bending area is in the bent state, the second back film layer 4 applies a reaction force to the bending end position of the bending area, so that metal wire(s) at the bending end position may be easily cracked. Comparing FIG. 1 with FIG. 5, in order to prevent cracks, in the embodiment, the second back film layer 4 is shrunk inwardly, namely, in the first direction, an end of the second back film layer 4 adjacent to the bending area is moved to be away from the bending area, so that the second back film layer 4 has a fourth end adjacent to the bending area 13 with a gap between the fourth end and the bending end position. In this way the bending stress at the bending end position can be reduced, thereby preventing the metal wire(s) distributed on the bending area 13 from being cracked.

In an exemplary embodiment, a distance between the first end and the bending start position in the first direction ranges from 100 μm to 300 μm.

In an exemplary embodiment, a distance between the fourth end and the bending end position in the first direction ranges from 100 μm to 500 μm.

In an exemplary embodiment, the display module further includes a cover plate 7, located at the light-emitting side of the display module, and an orthographic projection of the first back film layer 2 onto the cover plate 7 is located within an orthographic projection of the polarizer 5 onto the cover plate 7.

In the first direction, a first end of the first back film layer 2 adjacent to the bending area 13 is retracted so as to be away from the bending start position, and a second end of the polarizer 5 adjacent to the bending area 13 is extended so as to be flush with the bending start position. Therefore, in the first direction, the second end is exposed with respect to the first end, namely, the orthographic projection of the first back film layer 2 onto the cover plate 7 is located within the orthographic projection of the polarizer 5 onto the cover plate 7.

In an exemplary embodiment, an orthographic projection of the second back film layer 4 onto the cover plate 7 is located within the orthographic projection of the polarizer 5 onto the cover plate 7. (It should be noted that an AA display area is not shown in FIG. 4, in fact, the AA display area is arranged at left of the part shown in FIG. 4, and thus the area of the polarizer 5 (including the part not shown) is much larger than the area of the second back film layer 4)

In the first direction, a fourth end of the second back film layer 4 adjacent to the bending area 13 is retracted so as to be away from the bending end position, and the second end of the polarizer 5 adjacent to the bending area 13 is extended so as to be flush with the bending start position. In a second direction perpendicular to the first direction (the second direction being perpendicular to the display area 11), an orthographic projection of the bending start position onto the cover plate 7 coincides with an orthographic projection of the bending end position onto the cover plate 7. As a result, in the first direction, the orthographic projection of the second back film layer 4 onto the cover plate 7 is located within the orthographic projection of the polarizer 5 onto the cover plate 7.

In the first direction, the second back film layer 4 is shrunk inwardly with respect to the polarizer 5, namely, there is a gap between the second back film layer 4 and the bending end position, while a third end of the limiting support layer 8 adjacent to the bending area 13 is flush with the bending end position, such that a fourth end of the second back film layer 4 is located at a side of the third end of the limiting support layer 8 away from the bending area 13.

In an exemplary embodiment, the orthographic projection of the second back film layer 4 onto the cover plate 7 is arranged to be adjacent to the orthographic projection of the limiting support layer 8 onto the cover plate 7.

In an exemplary embodiment, in the first direction, the orthographic projection of the second back film layer 4 onto the cover plate 7 is at a side of the orthographic projection of the limiting support layer 8 onto the cover plate 7 away from the bending area 13.

In an exemplary embodiment, the support structure 3 has a first surface away from the display area 11 in a second direction (referring to the Y direction in FIG. 4), a side of the first surface away from the display area 11 is provided with a buffer layer 9. The second back film layer 4 at least partially covers the buffer layer 9; or the second back film layer 4 is located at a side of the buffer layer 9 away from the bending area 13. The second direction is perpendicular to the first direction, and the second direction is parallel to the light-emitting direction of the display module.

A distance between the second back film layer 4 and the bending end position determines a positional relationship between the second back film layer 4 and the buffer layer 9; the buffer layer 9 is deformable and can function as a buffer when bending the bending area 13, so as to avoid damage to the bonding area. Additionally, the buffer layer 9 also can enhance the connection stability between the second back film layer 4 and the support structure 3.

It should be noted that in a case that the second back film layer 4 is shrunk inwardly with respect to the bending end position, with a large amount of shrinkage in the direction pointing to the bonding area, there may be a floating area between the support structure 3 and the bonding area. Since the buffer layer 9 fills in this floating area (there is a gap between the buffer layer 9 and the bending end position), when bending the bending area 13, the buffer layer 9 can support the bonding area 12 and prevent the bonding area from being damaged.

In an exemplary embodiment, the orthographic projection of the limiting support layer 8 onto the cover plate 7 partially overlaps with the orthographic projection of the buffer layer 9 onto the cover plate 7, thereby avoiding a floating between the limiting support layer 8 and the support structure 3 without any support therebetween, and ensuring the strength and stability of the bonding area 12.

In an exemplary embodiment, there is a gap between the buffer layer 9 and the bending end position in the first direction. In this way, a situation in which bending stress at the bending end position is increased due to the fact that the end of the buffer layer 9 adjacent to the bending area is flush with the bending end position can be avoided.

In an exemplary embodiment, an end of the limiting support layer 8 away from the bending area is flush with an end of the buffer layer 9 away from the bending area (it should be noted that the "flush" herein can refer to a flush with some fabrication error, rather than an absolute flush).

The buffer layer 9 can be made of various materials, which may, for example, be foam tape.

In an exemplary embodiment, in the first direction, the support structure 3 has a third end adjacent to the bending area 13, the third end of the support structure 3 is flush with the first end (it should be noted that the "flush" herein can refer to a flush with some fabrication error, rather than an absolute flush).

In an exemplary embodiment, the orthographic projection of the support structure 3 onto the cover plate 7 coincides with the orthographic projection of the first back film layer 2 onto the cover plate 7.

In an exemplary embodiment, the thickness of the limiting support layer 8 ranges from 50 μm to 200 μm in the second direction (referring to the Y direction in FIG. 4). The second direction is perpendicular to the first direction, and is parallel to the light-emitting direction of the display module.

In an exemplary embodiment, an optical adhesive layer 6 is provided between the polarizer 5 and the cover plate 7, an orthographic projection of the optical adhesive layer 6 onto the cover plate 7 is located within the orthographic projection of the polarizer 5 onto the cover plate 7. That is to say, the area of the optical adhesive layer 6 is smaller than the area of the polarizer 5 so as to prevent the adhesive from overflowing.

In an exemplary embodiment, in the first direction, the optical adhesive layer 6 has a fourth end arranged adjacent to the bending area 13, and a distance between the fourth end of the optical adhesive layer 6 and the second end ranges from 50 μm (micrometer) to 100 μm, but the present disclosure is not limited thereto.

In an exemplary embodiment, when the bending area 13 is in the bent state, an outer side face of the bending area 13 away from the support structure 3 is not covered with any protective layer, and an inner side of the bending area 13 facing the support structure 3 is provided with a protective structure having a shape matching the shape of the bending area 13.

In another embodiment, the outer side face of the bending area 13 away from the support structure 3 is covered with a protective layer 300. Reference is made to FIG. 1, the bending area 13 is protected. However, due to the provision of the protective layer 300, the bending stress at the bending area 13 may be increased, in the embodiment removing the protective layer 300 can release such bending stress.

The provision of the protective structure 10 at the inner side face of the bending area 13 facing the support structure 3 can enhance the anti-impact performance of the bending area 13.

In an exemplary embodiment, the protective structure 10 has a circular or elliptical cross-section in the second direction, the second direction is perpendicular to the first direction, and the second direction is parallel to the light-emitting direction of the display module.

In an exemplary embodiment, a preset adhesive layer in a semi-cured state is formed in the bending area 13 before bending the bending area 13, and after bending the bending area 13, the preset adhesive layer is cured to form the protective structure 10 by absorbing moisture in the natural environment.

In an exemplary embodiment, a thickness of the preset adhesive layer is greater than or equal to the thickness of the first back film layer 2.

It should be noted that the preset adhesive layer in the semi-cured form can facilitate the deforming with the bending of the bending area, but the semi-cured state with 80% or more of curing no longer has fluidity.

In an exemplary embodiment, the thickness h of the preset adhesive layer satisfies $a \le h \le 2a$, where a is the thickness of the first back film layer.

In an exemplary embodiment, the thickness of the preset adhesive layer is greater than the thickness of the first back film layer, and the protective structure has an elliptical cross-section in a direction perpendicular to the first back film layer when the bending area is in the bent state.

In an exemplary embodiment, the thickness of the preset adhesive layer is equal to the thickness of the first back film layer, and the protective structure has a semi-circular cross-section in a direction perpendicular to the first back film layer when the bending area is in the bent state.

In an exemplary embodiment, a diameter of the protective structure is less than a distance between the first end of the first back film layer and the bending end position.

When the bending area 13 is in an unbent state, an adhesive material is coated on a side of the bending area 13 facing the support structure 3, and the adhesive material may be a resin adhesive (resin glue, but this is not a limitation). In the second direction, the thickness of the coated adhesive material is greater than or equal to the thickness of the first back film layer 2. After the adhesive is coated, the adhesive is cured by UV, so that the adhesive forms the preset adhesive layer with a low modulus in a short time. When bending the bending area 13, the preset adhesive material deforms conformally to be in the state having a circular or elliptical cross section when the bending area 13 is in the bent state. After the bending area 13 is bent, the protective structure 10 having a high modulus is formed by curing with moisture absorption in the natural environment.

It should be noted that the shape of the cross-section of the protective structure 10 in the second direction is related to the thickness of the coated adhesive. When the thickness of the adhesive is consistent with that of the first back film layer 2, a substantially semi-circular shape will be formed, and when the thickness of the coated adhesive exceeds the thickness of the first back film layer 2, an elliptical shape will be formed.

It should be noted that after curing, the protective structure 10 cooperates with the shape of the bending area, wherein the "cooperate" means that the bending area and the protective structure 10 have similar outlines, such that a gap portion formed by the bending of the bending area is fully filled, so as to realize a good support for the bending area.

In an exemplary embodiment, the protective structure is made of PF (Phenolics), but the present disclosure is not limited thereto.

In an exemplary embodiment, the support structure is made of aluminum plate or stainless steel, but the present disclosure is not limited thereto.

Figure 2:
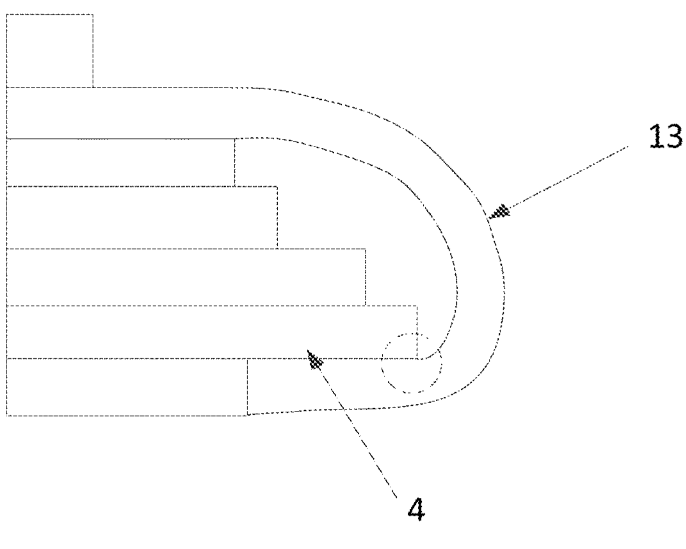
FIG. 2 shows a second schematic view of a display module.
Figure 3:
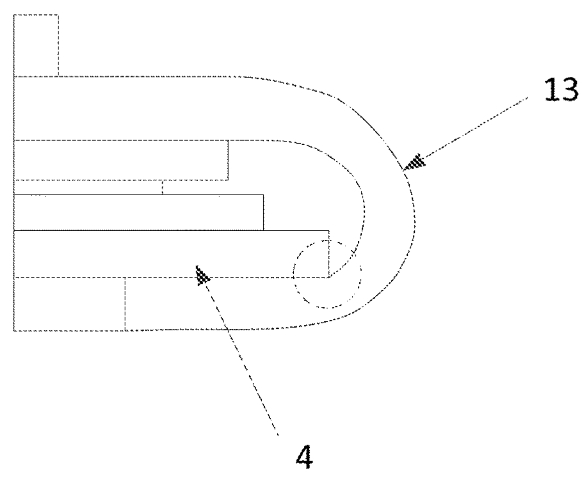
FIG. 3 shows a third schematic view of a display module.

FIGS. 2 and 3 are respectively schematic views of a display module in other embodiments. Display modules in FIGS. 2 and 3 have different thicknesses in the light-emitting direction of the display module, but the maximum bending stress in the bending area occurs at a position marked by the dotted circle in each figure, namely, at the bending end position (the bending start position is not marked, but it can be understood that the bending stress at the bending start position is relatively large, too, due to the arrangement of the back film layer). In the following table, a comparison for the bending stress between the display module according to the other embodiments shown in FIGS. 2 and 3, as well as in the embodiment of FIGS. 4 and 5 (in the embodiment, the maximum bending stress in the bending area of the display panel occurs at a position located between the bending start position and the bending end position).

| | | Display module in FIG. 2 | Display module in FIG. 3 | Display module in the embodiment according to FIGS. 4 and 5 |
|---|---|---|---|---|
| Bending radius | | 0.1 mm | 0.1 mm | 0.05 mm |
| Bending Stress % | PNL (display substrate) | 13.49 | 14.25 | 10.1 |
| | Sd (metal wire) | 9.17 | 10.42 | 7.5 |

It can be seen from the table that, compared with the display modules in FIGS. 2 and 3, in the display module in the embodiment according to FIGS. 4 and 5, the bending stress of the metal wire is reduced while the bending radius of the bending area is also reduced.

Embodiments of the present disclosure also provide a display device, including the display module described above.

It is to be understood that the above-described embodiments are merely exemplary embodiments that have been employed to illustrate the principles of the present disclosure, and that the disclosure is not limited thereto. It will be apparent to those skilled in the art that various modifications and variations can be made without departing from the spirit or scope of the disclosure, these modifications and variations also fall within the scope of the disclosure.

What is claimed is:

1. A display module, comprising: a display panel, the display panel comprising a display area, a bonding area, and a bending area located between the display area and the bonding area, wherein the bending area enables the bonding area to be bent to a backlight side of the display area, and when the bending area is in a bent state, the backlight side of the display area is provided with a first back film layer, wherein a direction from the display area to the bending area is a first direction, and the first direction is arranged to be parallel to a display surface of the display area;

the bending area comprises a bending start position and a bending end position, wherein the bending start position is connected to the display area, and the bending end position is connected to the bonding area;

in the first direction, the first back film layer has a first end adjacent to the bending area, a gap is provided between the first end and the bending start position;

a polarizer is disposed at a light-emitting side of the display area, and in the first direction, the polarizer has a second end adjacent to the bending area, and the second end is flush with the bending start position; and when the bending area is in the bent state, a limiting support layer is provided at a side of the bonding area away from the display area, and a third end of the limiting support layer adjacent to the bending area is flush with the bending end position.

2. The display module according to claim 1, wherein a support structure is provided between the display area and the bonding area, the first back film layer is provided between the support structure and the display area, and a second back film layer is provided between the support structure and the bonding area; and in the first direction, the second back film layer has a fourth end adjacent to the bending area, a gap is provided between the fourth end and the bending end position.

3. The display module according to claim 1, wherein in the first direction, a distance between the first end and the bending start position ranges from 100 μm to 300 μm.

4. The display module according to claim 2, wherein in the first direction, a distance between the fourth end and the bending end position ranges from 100 μm to 500 μm.

5. The display module according to claim 2, further comprising: a cover plate located at a light-emitting side of the display panel, and an orthographic projection of the first back film layer onto the cover plate is within an orthographic projection of the polarizer onto the cover plate.

6. The display module according to claim 5, wherein an orthographic projection of the second back film layer onto the cover plate is within the orthographic projection of the polarizer onto the cover plate.

7. The display module according to claim 5, wherein when the bending area is in the bent state, the orthographic projection of the second back film layer onto the cover plate partially overlaps with an orthographic projection of the limiting support layer onto the cover plate; or wherein when the bending area is in the bent state, the orthographic projection of the second back film layer onto the cover plate is located at a side of an orthographic projection of the limiting support layer onto the cover plate away from the bending area.

8. The display module according to claim 5, wherein in a second direction, the support structure has a first surface away from the display area, a buffer layer is disposed at a side of the first surface away from the display area; the second back film layer at least partially covers the buffer layer; or, the second back film layer is located at a side of the buffer layer away from the bending area; wherein the second direction is perpendicular to the first direction, and the second direction is parallel to a light-emitting direction of the display module.

9. The display module according to claim 8, wherein an orthographic projection of the limiting support layer onto the cover plate partially overlaps with an orthographic projection of the buffer layer onto the cover plate.

10. The display module according to claim 8, wherein in the first direction, a gap is provided between the buffer layer and the bending end position.

11. The display module according to claim 1, wherein in the first direction, the support structure has a third end adjacent to the bending area, the third end of the support structure is flush with the first end.

12. The display module according to claim 5, wherein an orthographic projection of the support structure onto the cover plate coincides with the orthographic projection of the first back film layer onto the cover plate.

13. The display module according to claim 1, wherein in a second direction, a thickness of the limiting support layer ranges from 50 μm to 200 μm, the second direction is perpendicular to the first direction, and the second direction is parallel to a light-emitting direction of the display module.

14. The display module according to claim 5, wherein an optical adhesive layer is provided between the polarizer and the cover plate, and an orthographic projection of the optical adhesive layer onto the cover plate is within the orthographic projection of the polarizer onto the cover plate.

15. The display module according to claim 14, wherein in the first direction, the optical adhesive layer has a fourth end disposed adjacent to the bending area, a distance between the fourth end of the optical adhesive layer and the second end ranges from 50 μm to 100 μm.

16. The display module according to claim 1, wherein when the bending area is in the bent state, an outer side face of the bending area away from the support structure is not covered with a protective layer, and an inner side face of the bending area facing towards the support structure is provided with a protective structure.

17. The display module according to claim 16, wherein in a second direction, a cross-section of the protective structure is circular or elliptical, the second direction is perpendicular to the first direction, and the second direction is parallel to a light-emitting direction of the display module.

18. The display module according to claim 16, wherein a preset adhesive layer in a semi-cured state is provided at the bending area before bending the bending area, and the preset adhesive layer is cured to form the protective structure by absorbing moisture in a natural environment after bending the bending area.

19. The display module according to claim 16, wherein a diameter of the protective structure is less than a distance between the first end of the first back film layer and the bending end position.

20. A display device, comprising:

a display module, wherein the display module comprises a display panel, the display panel comprises: a display area, a bonding area, and a bending area located between the display area and the bonding area, wherein the bending area enables the bonding area to be bent to a backlight side of the display area, and when the bending area is in a bent state, the backlight side of the display area is provided with a first back film layer, wherein a direction from the display area to the bending area is a first direction, and the first direction is arranged to be parallel to a display surface of the display area;

the bending area comprises a bending start position and a bending end position, wherein the bending start position is connected to the display area, and the bending end position is connected to the bonding area;

in the first direction, the first back film layer has a first end adjacent to the bending area, a gap is provided between the first end and the bending start position;

a polarizer is disposed at a light-emitting side of the display area, and in the first direction, the polarizer has a second end adjacent to the bending area, and the second end is flush with the bending start position; and when the bending area is in the bent state, a limiting support layer is provided at a side of the bonding area away from the display area, and a third end of the limiting support layer adjacent to the bending area is flush with the bending end position.

* * * * *